United States Patent [19]

Sugihara et al.

[11] 4,393,837
[45] Jul. 19, 1983

[54] SPARK TIMING CONTROL SYSTEM FOR AN INTERNAL COMBUSTION ENGINE

[75] Inventors: Kunihiko Sugihara, Takasho; Michio Onoda, Yokohama, both of Japan

[73] Assignee: Nissan Motor Company, Limited, Yokohama, Japan

[21] Appl. No.: 173,811

[22] Filed: Jul. 30, 1980

[30] Foreign Application Priority Data

Aug. 6, 1979 [JP] Japan ........................... 54-100115

[51] Int. Cl.³ .................................................. F02P 5/04
[52] U.S. Cl. ................................... 123/425; 123/435
[58] Field of Search ............... 123/422, 423, 424, 425, 123/435, 568 R

[56] References Cited

U.S. PATENT DOCUMENTS 4,242,996  1/1981  Urbansky ........................... 123/425
4,274,379  6/1981  Iwata et al. ......................... 123/425

FOREIGN PATENT DOCUMENTS

52-24627    2/1977  Japan ........................... 123/435
54-152717  12/1979  Japan ........................... 123/425
55-43206    3/1980  Japan ........................... 123/435
55-114878   9/1980  Japan ........................... 123/425
55-156256  12/1980  Japan ........................... 123/425

Primary Examiner—Parshotam S. Lall
Attorney, Agent, or Firm—Schwartz, Jeffery, Schwaab, Mack, Blumenthal & Koch

[57] ABSTRACT

An ignition spark timing control system for an internal combustion engine capable of controlling the ignition spark advance angle corresponding to a knocking condition of the engine. The spark timing control system includes a means for retarding spark timing in response to an engine knocking condition and a means for detecting unstable driving condition of the engine and interrupting the retarding of the spark timing when the engine driving condition is unstable in order to maximize the engine output characteristics and improve fuel economy.

18 Claims, 9 Drawing Figures

SPARK TIMING CONTROL SYSTEM FOR AN INTERNAL COMBUSTION ENGINE

BACKGROUND OF THE INVENTION

Field of the Invention

The present invention relates generally to a spark ignition timing control system for an internal combustion engine to be mounted on such as an automotive vehicle. More particularly, the invention relates to a feedback control system for feedback controlling spark timing of a spark ignition system of the internal combustion engine corresponding to knocking condition of the engine.

Background of the Invention

Generally, knocking in an internal combustion engine will cause the shortening of its life time, particularly, when a substantive knocking condition is continued, the engine will be damaged. On the other hand, in view of fuel economy and maximize engine output characteristics, it is desirable to operate the engine at a threshold knocking condition. As is well-known to those skilled in the art, in order to cause knocking in an internal combustion engine, the spark advance angle of the spark ignition system can be adjusted. In general, by advancing the ignition spark advance angle, the knocking condition of the engine is increased. Therefore, control of the knocking condition can be accomplished by controlling spark advance angle corresponding to engine knocking conditions and other parameters. In the prior art, there have been developed and proposed various systems, for maintaining an internal combustion engine in a lightly knocking condition by feedback controlling the spark advance angle in order to improve fuel economy and maximize engine output characteristics.

On the other hand, it is also well known that under knocking conditions, the occurrence of specific frequency ranges of engine vibration are rapidly increased depending upon variations of the internal pressure in the combustion chamber. The specific engine vibration frequency corresponding to a knocking conditin is generally within a range of 6 to 9 KHz. Utilizing this characteristic of the engine vibration, there have been proposed various systems for detecting knocking conditions of the engine by detecting the specific frequency range of the engine vibration. For detecting the engine vibration, there is provided a vibration sensor on the internal combustion engine, which detects the above-mentioned specific range of engine vibration. The detected vibration frequency may be converted into an analog signal which is smoothed and thereafter compared with the vibration element of the specific frequency range to generate a signal. The signal is integrated per every given crank rotational angle. When the integration value exceeds a predetermined value, the engine is regarded as being driven in a knock condition and the system generates a knocking signal. Corresponding to this knocking signal, the spark advance angle is appropriately feedback controlled.

Under specific engine driving conditions, such as when exhaust gas is recirculated to the combustion chamber, or when warming up, or under relatively low load driving conditions or decelerated conditions, the burning condition of each combustion chamber may be remarkably different from the other combustion chambers. The engine may therefore become unstable and cause frequent variations of engine vibration frequency. This may cause the system to erroneously detect an engine knocking condition and to generate a knocking signal, even when the engine is not knocking and is being driven normally. For example, unstable driving conditions may lead to the occurrence of the rapid generation of engine vibration frequency signals of a specific range. In this case, the specific frequency range of vibration will be detected by the vibration sensor to cause erroneous or unnecessary knocking signals. Responsive to the erroneous knocking signal, the spark advance angle may be retarded unnecessarily.

On the other hand, under the above-mentioned unstable engine driving condition where knocking does not occur, it is desirable to advance the ignition spark timing to the so-called Maximum advance for Best Torque (MBT) for fuel economy and for maximizing the engine output characteristics. Therefore, it becomes necessary to interrupt the operation of the system for feedback controlling the spark advance angle in response to the specific frequency range of engine vibration, if the engine is driven under unstable conditions.

SUMMARY OF THE INVENTION

Therefore, it is an object of the present invention to provide a ignition spark timing control system which can control spark advance angle in response to knocking conditions in an internal combustion engine and which can interrupt the retarding of the spark advance angle when the engine is driven under unstable condition such as, for example, the engine being decelerating, the engine load being relatively low, the engine coolant temperature being relatively low and/or exhaust gas recirculation being performed.

To accomplish the above-mentioned and other objects of the present invention, there is provided a spark ignition timing control system which includes a means for retarding the spark advance angle in response to a knocking condition of the internal combustion engine and a means for interrupting the retarding of the spark advance angle when the engine is being driven under relatively low load condition, or is being decelerated, or the engine or engine coolant temperature is relatively low, the starter switch being turned on, or exhaust gas recirculation is being performed or other similar conditions.

In the preferred embodiment of the invention, the means for interrupting retarding of the spark advance angle comprises a shorting circuit which includes a switching means which also acts as a sensor for detecting conditions such as the throttle valve angle, the air flow rate flowing through an air intake passage or the venturi portion thereof, the intake vacuum flowing through the intake manifold, the engine coolant temperature, the ignition swith position, the EGR valve position, for example.

BRIEF DESCRIPTION OF THE DRAWINGS

The present invention will become more fully understood from the detailed description given below, and from accompanying drawings of the preferred embodiment of the present invention, which, however, are not to be taken limitative of the present invention in any way, but are for the purpose of elucidation and explanation only.

In the drawings.

DESCRIPTION OF THE PREFERRED EMBODIMENT

Figure 1:
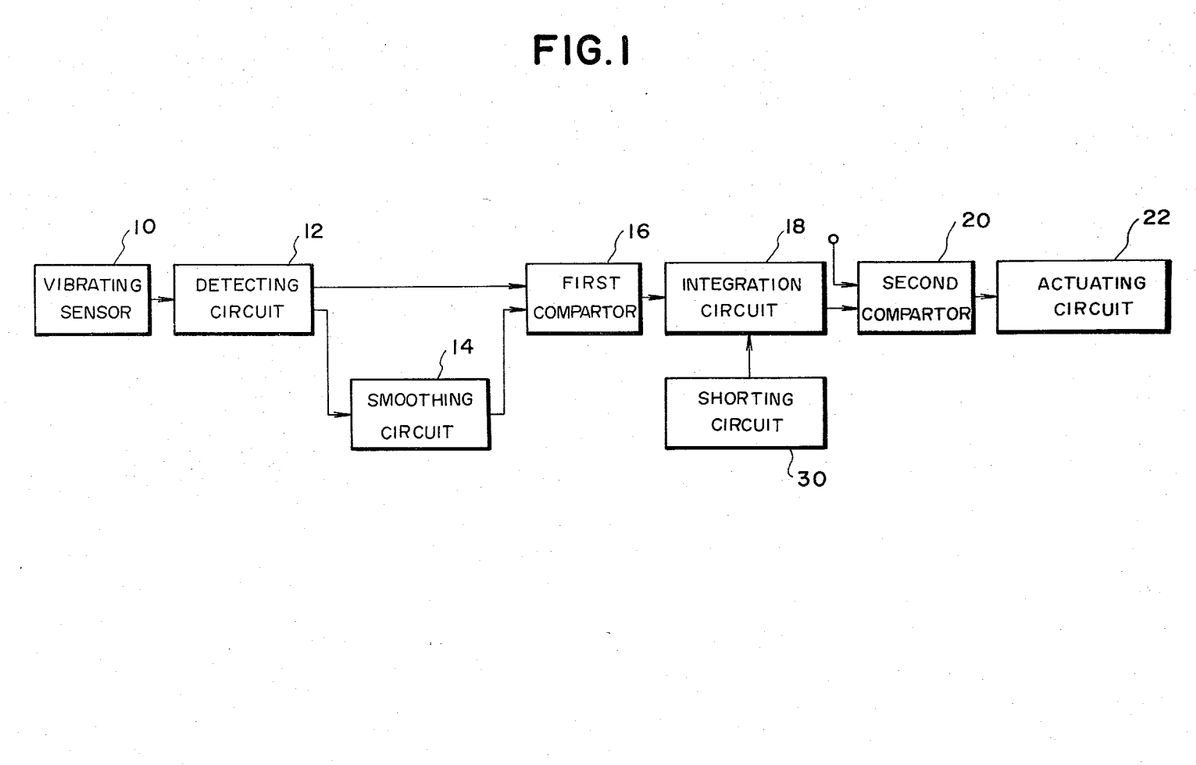
FIG. 1 is a schematic block diagram of a preferred embodiment of a spark timing control system according to the present invention.
Figure 2:
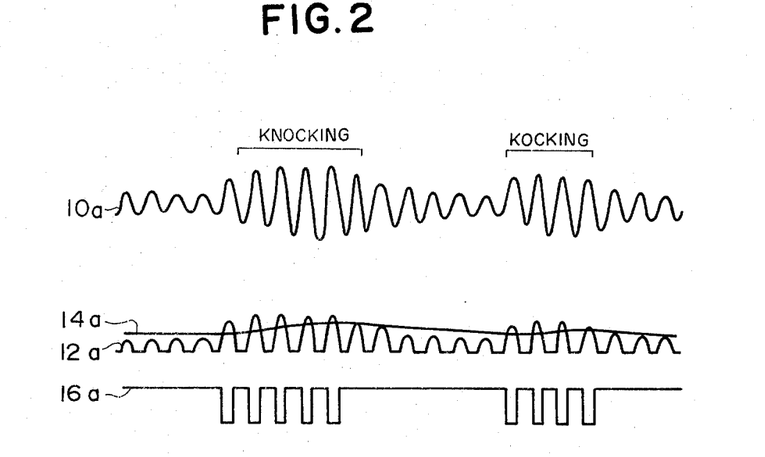
FIG. 2 is a illustration showing wave forms of signals respectively generated by a vibration sensor, a detecting circuit, a smoothing circuit and a first comparator.
Figure 3:
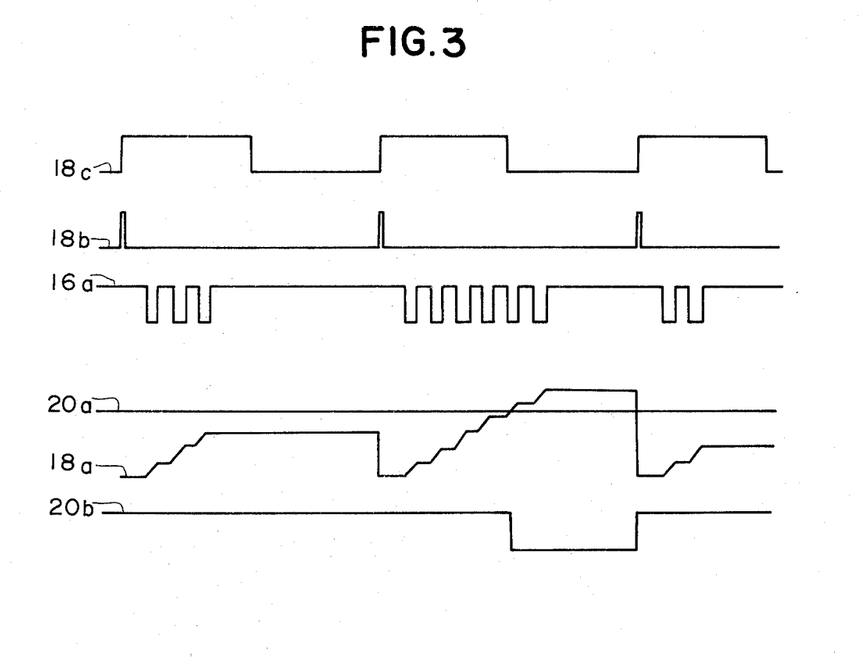
FIG. 3 is a illustration showing wave forms of signals generated by a first sensor signal which is substantially the same as the wave of form signal of the first comparated as illustrated in FIG. 2, a integration circuit and a second comparator, and an spark ignition pulse and reset pulse.

Referring now to the drawings, particularly to FIGS. 1 to 3, there is illustrated a preferred embodiment of a spark ignition timing control system according to the present invention. In FIG. 1, the reference numeral 10 denotes a vibration sensor provided on an internal combustion engine for detecting vibration of the engine generated under knocking condition thereof. As the vibration sensor, various constructions of sensors sensible of engine vibration within a specific frequency range corresponding to engine knocking condition and generating sensor signals responsive to the engine vibration can be employed. Generally, the vibration sensor for detecting the engine vibration includes a resonator resonating the specific frequency range of vibration generating output signal. The sensor signal generated by the vibration sensor 10 is fed to a detecting circuit 12. As shown in FIG. 2, the vibration sensor 10 generates a signal which has a wave form illustrated as curve 10a of FIG. 2. That signal passes through the detecting circuit 12, wherein the positive portion of the sensor signal 10a is detected to generate an output as illustrated by 12a in FIG. 2. The detector output 12a of the detecting circuit 12 is fed to a smoothing circuit 14 to be smoothed as illustrated in FIG. 2 as curve 14a. The smoothed signal 14a is fed to a first comparator 16 along the output 12a of the detecting circuit 12. In the first comparator 16, the signals 12a and 14a are compared. The first comparator 16 generates negative pulse signal, as illustrated by 16a in FIG. 2, when the value of the detected output 12a is larger than the smoothed output 14a. The negative pulse signal 16a outputted from the first comparator 16 is fed to an integration circuit 18.

Since the wave height of the sensor signal 10a corresponds to the magnitude of knocking caused by the engine, the pulse frequency and pulse width of the negative pulse signal 16a also corresponds to the magnitude of knocking. Therefore, the result obtained by interation operation, which is indicative of relative variation of the output level of the vibration sensor 10, corresponds to the knocking strength. Namely, when the knocking is of a comparably high magnitude, the integrated value of signal 16a is increased whereby it allows discontinuation of a knocking condition of the engine. The integrated value of the integration circuit 18 is as shown in FIG. 3 as represented 18a. As seen from FIG. 3, the level of the integrated output 18a is proportional to the number of pulses in a group of pulses in a wave train 16a.

The integrated output 18a of the integration circuit 18 is reset by a reset pulse 18b which is generated at the rising point of ignition spark command pulse 18c in synchronism with a crank rotation. Therefore, the integrated output 18a is reset per ignition.

The integrated output 18a is fed to a second comparator 20. In the second comparator 20, the integrated output 18a is compared with a reference signal $+V_0$ which is illustrated as line 20a in FIG. 3. The comparator 20 detects a knocking condition of the engine when the integrated output 18a exceeds the value of reference signal 20a. Responsive to exceeding the integrated output 18a beyond the reference signal 20a, the comparator 20 generates a negative pulse signal as illustrated as line 20b in FIG. 3. The negative pulse signal 20b works as knocking pulse for actuating an arithmetic circuit (not shown). The actuating circuit 22 operates to actuate the arithmetic circuit for feedback controlling the spark advance angle corresponding to the negative pulse signal 20b. In the operation of the actuating circuit 22, responsive to the negative pulse signal 20b, the actuating circuit 22 retards the immediately proceeding spark advance angle at a given rate. On the other hand, when the actuating circuit 22 does not detect the negative pulse signal 20b, the spark advance angle is advanced at a given rate. Therefore, the spark timing is continuously advanced until the timing causes knocking in the engine. By this operation, the spark timing is kept adjacent the threshold point between the knocking condition and normal driving condition of the engine.

If the engine does not enter into the knocking condition even when the spark timing is continuously advanced, advancing of the spark timing is stopped at a predetermined maximum spark advance angle.

Under unstable engine driving condition, for example when the exhaust gas is recirculated into the combustion chamber, or when the engine is idling for warm up, or where the engine is driven under relatively low load condition or is decelerating, or when the engine or engine coolant temperature is relatively low, the output level of the vibration sensor 10 remarkably varies depending upon unstability of engine and may generate the specific frequency range of vibration even though the engine is not knocking. If the output level of the vibration sensor is significantly increased, the second comparator 20 may generate a negative pulse signal indicative of knocking. Responsive to the negative pulse signal erroneously generated in the second comparator 20, the actuating circuit 22 will then operate to actuate the arithmetic circuit for unnecessarily retarding the spark advance angle. In addition, under unstable engine driving condition, such as those mentioned above, the possibility of causing knocking in the engine is quite small and therefore it is desirable to advance the spark advance angle to the Maximum advance for Best Torque for fuel economy and maximizing engine output characteristics. Therefore, it is desirable to inhibit generating the negative pulse signal under such unstable engine driving condition.

For accomplishing this purpose, the spark timing control system according to the present invention is provided with a shorting circuit 30 shown in FIG. 1. The shorting circuit is connected to the integration circuit 18, for example. The shorting circuit generally comprising a switching means which is closed in response to detecting unstable driving condition of the engine and a means for connecting the switching means to the output terminal of the integration circuit. For detecting unstable engine driving condition, various engine parameters or conditions may be sensed. These parameters or conditions include detecting engine deceleration, detecting the air flow rate flowing through the air intake passage or intake vacuum pressure flowing through intake manifold the latter are detected for determining when the engine is in a relatively low load driving condition, the engine coolant temperature may be compared with a predetermined temperature, the starter switch position may be checked and the EGR valve position may be checked. If an unstable driving condition of the engine is detected, the switching means is actuated to complete the shorting circuit. Thus, the output of the integration circuit flows through the shorting circuit to short the output therefrom and thereby to make the input of the second comparator zero. Therefore, the second comparator 20 will not operate to generate the negative pulse signal so as not to actuate the actuating circuit 22.

FIGS. 4 to 9 show respective embodiments of the shorting circuit 30 to be connected with output terminals of the integration circuit 18 of FIG. 1. These shorting circuits include switching means which are operative in response to unstable engine driving condition.

Figure 4:
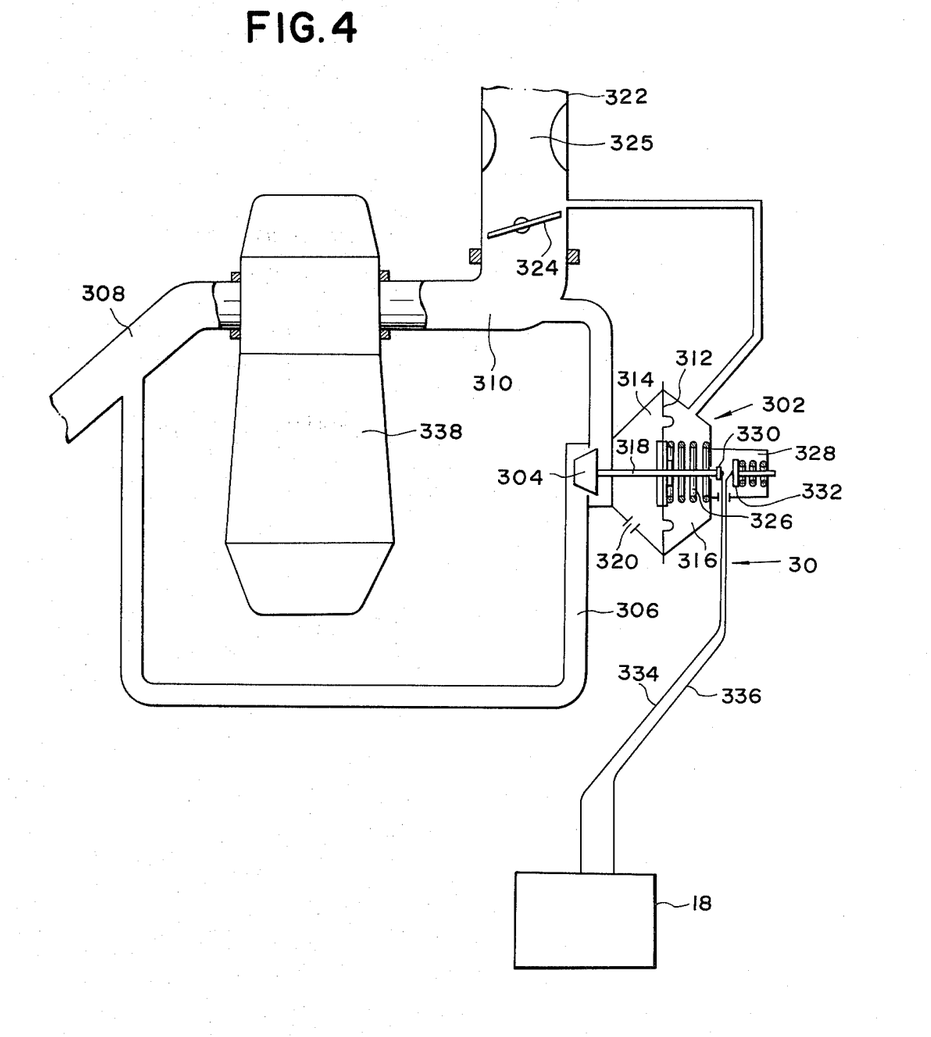
FIG. 4 is a diagramatical view of an internal combustion engine, including one embodiment of a shorting circuit employed in the spark timing control system of FIG. 1, which shorting circuit becomes operative in response to performing exhaust gas recirculation.

Referring to FIG. 4, there is illustrated a shorting circuit 30 with a switching means for use in the control system of FIG. 1, which switching means is provided in an exhaust gas recirculation valve (EGR valve) 302. The EGR valve 302 has a valve member 304 for opening and closing an exhaust gas recirculation passage 306 connecting an exhaust passage 308 to an intake manifold 310. The valve member 304 is secured on a diaphragm 312 which partitions the interior of the EGR valve 302 into two chambers 314 and 316, through a stem 318. The chamber 314 of the EGR valve 302 is exposed to atmosphere through an opening 320. On the other hand the chamber 316 communicates with an air intake passage 322 at the upstream of a throttle valve 324 to introduce vacuum pressure flowing through the venturi 325, through a passage 323. A set spring 326 determining set pressure of the EGR valve 302 is disposed within the chamber 316.

The stem 318 extends through the chamber 316 and into a chamber 328 leak-proofingly separated from the chamber 316. The other end of the stem has a electrically conductive contact 330. The contact 330 opposes a stationary contact 332. Both of contacts are connected with the output terminal of the integration circuit 18 through leads 334 and 336. In this construction the contacts 330 and 332 and leads 334 and 336 consist of the shorting circuit 30. The reference numeral 338 denotes an internal combustion engine.

If the throttle valve 324 is opened to a predetermined angle, vacuum pressure introduced into the chamber 316 exceeds the set pressure determined by the set spring. Wherever the vacuum pressure exceeds the set pressure, the diaphragm 312 moves toward the chamber 316 to open the EGR passage 306 to recirculate the exhaust gas into the engine 338. At this time, by movement of the diaphragm 312 together with the valve member 304, the valve stem 318 moves accordingly to contact the contact 330 onto the stationary contact 332 to complete the shorting circuit 30.

Thus, according to the hereabove illustrated embodiment of the shorting circuit 30, in response to performing exhaust gas recirculation, the shorting circuit 30 becomes operative to short the output of the integration circuit 18.

Figure 5:
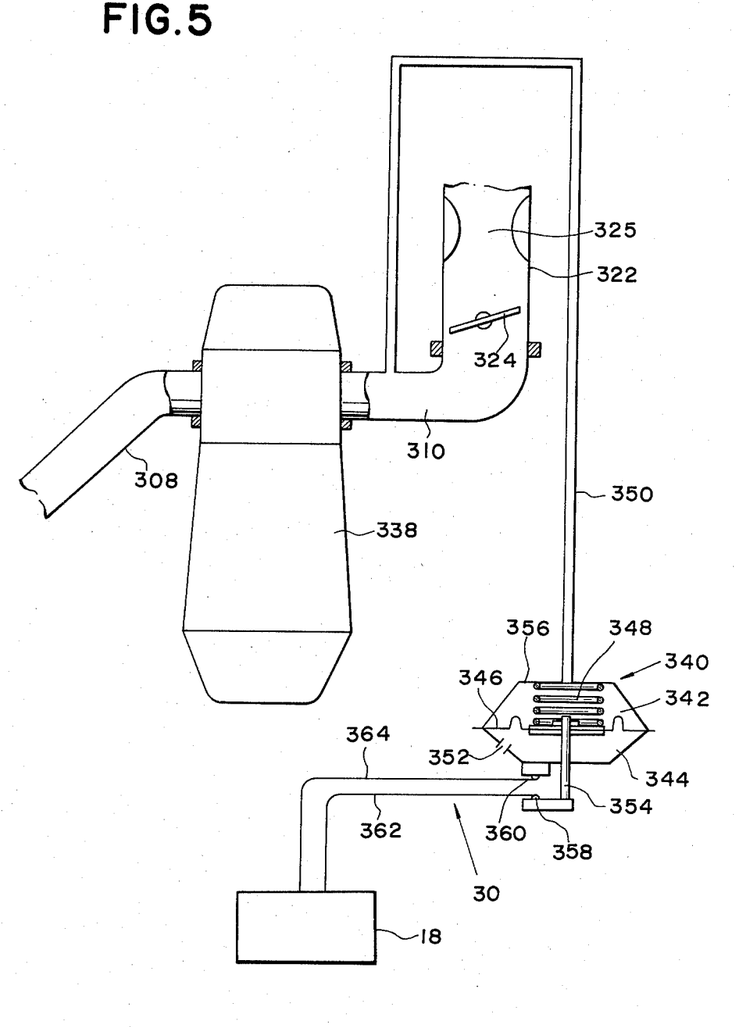
FIG. 5 is a diagramatical view of the internal combustion engine having a vacuum sensor which act as switching means of the shorting circuit to be employed in the spark timing control system of FIG. 1, which shorting circuit becomes operative corresponding to vacuum pressure of the intake manifold exceeding a given value.

Referring to FIG. 5, there is illustrated another embodiment of the shorting circuit 30 for use with the spark timing control system of FIG. 1. In this embodiment, the switching means is provided on a vacuum sensor 340 for detecting intake vacuum flowing through the intake manifold 310. The vacuum sensor 340 has pressure chamber 342 and reference pressure chamber 344 partitioned from one another by a diaphragm 346. Within the pressure chamber 342, a set spring 348 is provided for determining set pressure of the sensor. The pressure chamber 342 communicates with the intake manifold 310 through a passage 350. On the other hand, the reference pressure chamber 344 communicates with atmosphere through an opening 352. On the diaphragm, one end of a rod 354 is secured so that it can move together with the diaphragm. The rod 354 extends through the reference pressure chamber 344 to outside of a sensor casing 356, and has the other end on which is provided an electrically conductive contact 358. The contact 358 mates to a stationary contact 360 which is mounted on the sensor casing 356. Both of contacts are connected with the output terminals of integration circuit 18 through leads 362 and 364.

Generally, upon vehicle deceleration or the engine being driven under relatively low load, the intake vacuum flowing through the intake manifold becomes smaller. When the intake vacuum reaches a predetermined value, for example, 400 mmHg, the contact 358 is moved together with the diaphragm 346 to contact with the contact 360. By this, the shorting circuit 30 is completed to short the output of the integration circuit.

Thus, according to the shorting circuit 30 as hereabove, illustrated, the output of the integration circuit 18 is interrupted to be fed to the second comparator 20 in response to decelerating of the engine or relatively low load condition thereof.

Figure 6:
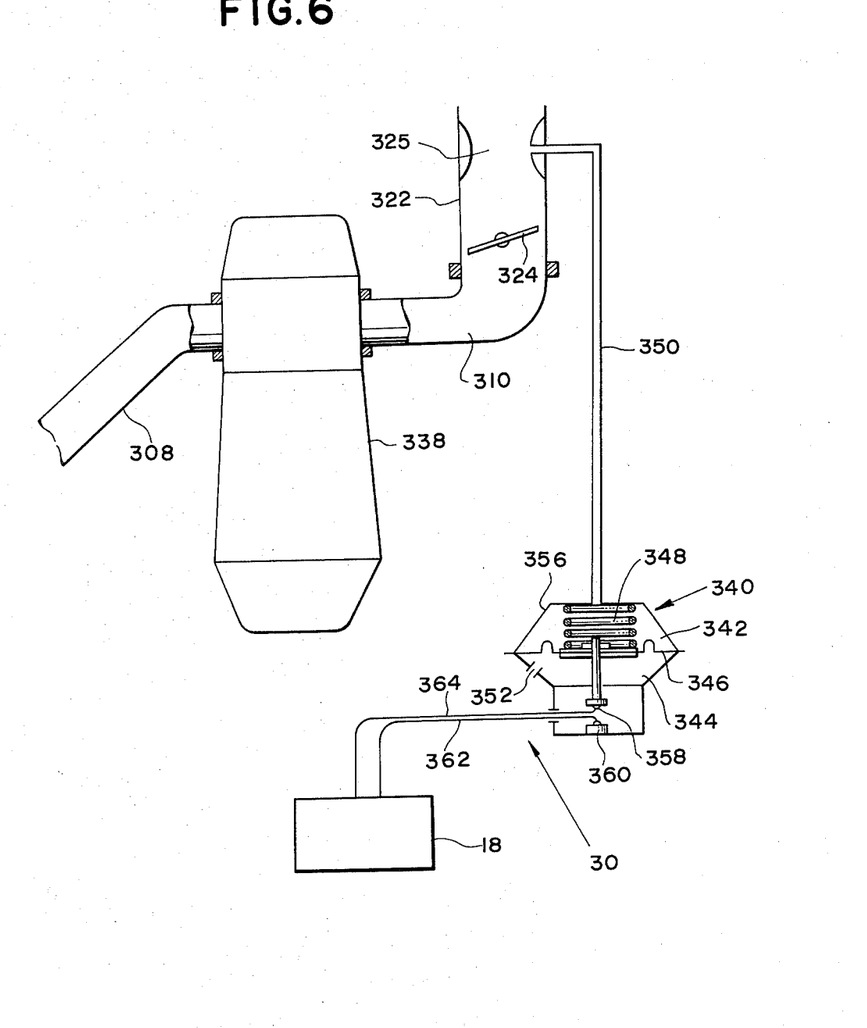
FIG. 6 is a diagramatical view of the internal combustion engine with the shorting circuit having a pressure sensor for detecting air pressure flowing through the venturi portion to be employed in the spark timing control system of the invention which is illustrated as modification of FIG. 5.

Alternatively, as shown in FIG. 6, the engine decelerating condition or relatively low load condition of the engine can be detected by determining air pressure flowing through the venturi 325 of the air intake passage. In this case, the pressure chamber 342 of the vacuum sensor 340 communicates with the venturi portion 325 of the air intake passage 322. As seen from FIG. 6, the constructions and functions of the sensor 340 and the shorting circuit 30 are substantially the same as foregoing embodiment as illustrated with reference to FIG. 5 although the sensor in this modification acts as pressure sensor.

Figure 7:
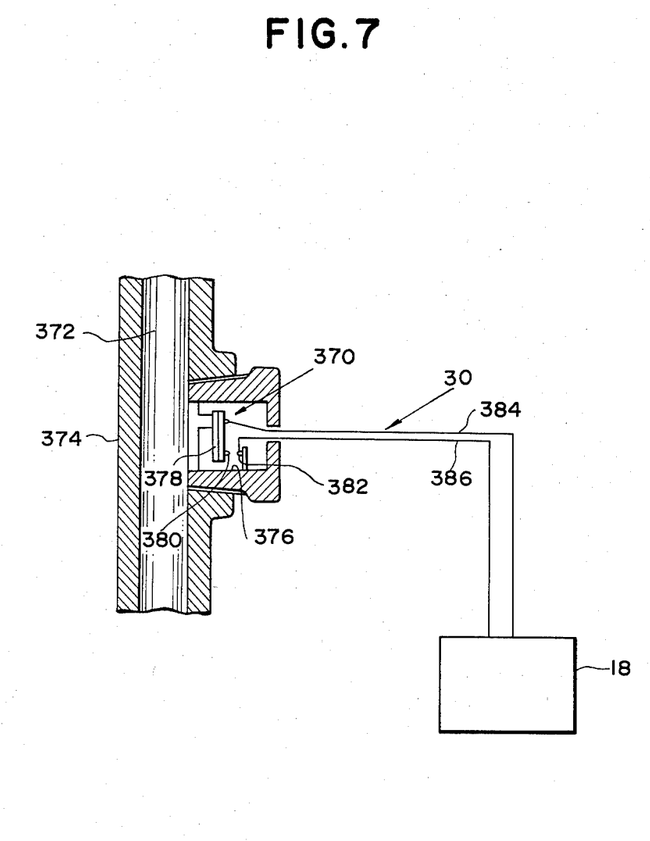
FIG. 7 is a fragmentary sectional view of an engine cylinder block having an engine coolant chamber or passage to which is provided with a coolant temperature sensor to act as switching means of the shorting circuit to be employed in the spark timing control system of FIG. 1, which shorting circuit becomes operative corresponding to engine coolant temperature being lower than a given temperature.

FIG. 7 shows a further embodiment of the shorting circuit 30 for use with the spark timing control system according to the present invention. A switching means 370 of the shorting circuit 30 is provided within an engine coolant passage or chamber 372 formed in an engine cylinder block 374. The cylinder block 374 is formed with a recess 376 communicating with the coolant passage or chamber 372. The switching means 370 is disposed within the recess 376 and thereby exposed to engine coolant such as cooling water. The switching means 370 may comprise a bimetal 378 supported within the recess and having a contact 380 and a stationaly contact 382. As will be appreciated by one of skill in the art, any other thermally sensitive switching arrangement may be used. Both of contacts 380 and 382 are mating together and are connected with the output terminal of the integration circuit 18 through leads 384 and 386. Therefore, the contacts 380 and 382 and leads 384 and 386 consist the shorting circuit 30.

The bimetal 378 has characteristics to bend toward right in FIG. 7 responsive to lowering of the coolant excessive to a predetermined temperature, for example 40° C. By bending of the bimetal, the contact 380 contacts the contact 382 to close the shorting circuit 30. Thus, when the engine coolant temperature is lower than a predetermined value, the output of the integration circuit 18 is shorted and may not be fed to the second comparator 20.

Figure 8:
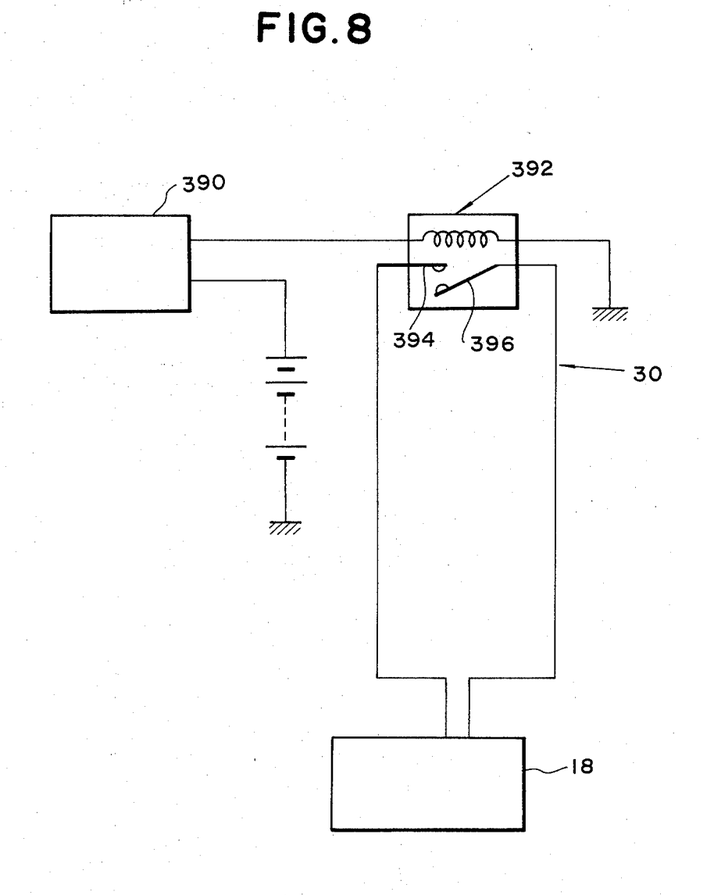
FIG. 8 is a schematic circuit diagram of an ignition switch in which is provided with a relay circuit operative in response to turning on of the starter switch, which the relay circuit acts as switching means of the shorting circuit.

Referring to FIG. 8, there is a still another embodiment of the shorting circuit 30 which becomes operative in response to turning on of the starter switch 390. A relay circuit 392 is connected with the starter switch 390 in series. The relay circuit 392 includes a pair of contacts 394 and 396 which contact together in response to turning on of the starter switch 390. Both of contacts are connected with the output terminal of the integration circuit 18 in order to short the output of the integration circuit 18 when the relay 392 is activated.

Thus, when the starter switch is turned on, the integration circuit 18 is shorted not to feed the output to the second comparator.

Figure 9:
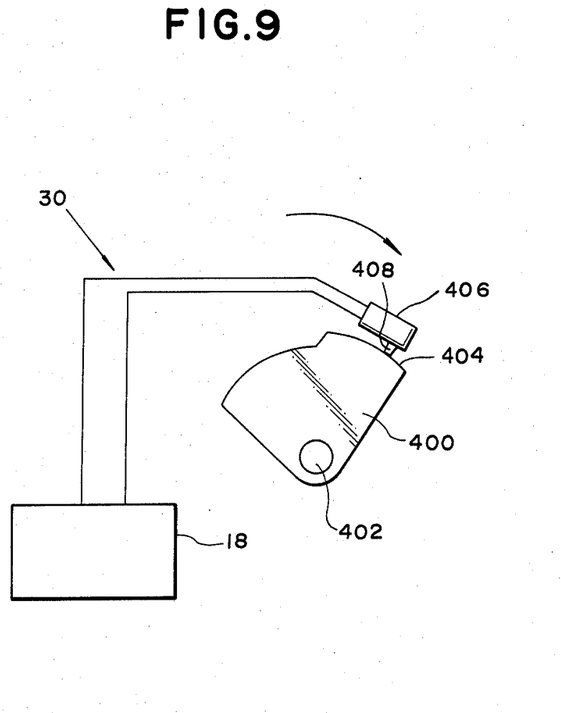
FIG. 9 is a fragmentary view of throttle portion of the engine showing a switching means for the shorting circuit to be employed for the spark timing control system of FIG. 1 which becomes operative in response to reducing the throttle angle excessive to a given angle.

FIG. 9 shows still another embodiment of the shorting circuit 30 being operative corresponding to throttle valve angle. A cam member 400 is coaxially provided on a shaft 402 with the throttle valve. On the outer periphery of the cam member 400, a stepped up portion 404 is formed. Opposing to the cam surface of the cam member 400, there is provided a micro-switch 406 with a switch element 408. The switch element 408 normally contacts with the cam surface.

When the throttle valve is closed and therefore the engine is decelerated or the engine is driven under low load condition, the stepped up portion 404 of the cam member 400 contacts the switching element 408 to turn on the micro-switch. The micro-switch is connected with the output terminals of the integration circuit 18. Thereby, in response to turning on of the micro-switch 406, the output of the integration circuit 18 flows through the shorting circuit.

Although the present invention has been illustrated as hereinabove, the invention should not be considered as limitative to these embodiment. Namely, the shorting circuit is provided not always one for the output terminals of the integration circuit but also can be used in coupled and incorporated manner of several circuits. Preferably, the shorting circuits are arranged for detecting the engine decelerating condition, relatively low load driving condition of the engine, relatively low temperature of engine coolant and other parameters to interrupt advancing spark timing. Further, the shorting circuit or circuits are not necessarily connected to the output terminals of the integration circuit but can be connected to any suitable terminal in order to interrupt advancing spark timing. Therefore, it should be noted that the scope of the present invention is to be considered as including any modifications and embodiments which are within the teachings of the present invention without departing from the principle of the invention. The scope of the present invention is defined by the appended claims.

What is claimed is:

1. A spark ignition timing control system for use with an internal combustion engine comprising:
   (a) a first means for sensing engine vibration magnitude, and for comparing said sensed vibration magnitude with a first predetermined value and generating an output signal when said sensed vibration magnitude is greater than said first predetermined value;
   (b) a second means for comparing the output signal of said first means with a second predetermined value and generating a knocking signal when the output signal of said first means is greater than said second predetermined value;
   (c) a third means for adjusting the engine spark advance angle in response to said knocking signal; and
   (d) a fourth means for detecting an unstable engine condition and interrupting operation of said third means in response thereto,
whereby upon the occurrence of an unstable engine condition said engine spark advance angle adjustment is suspended.

2. A control system as set forth in claim 1, wherein said first means includes a vibration sensor for determining the engine vibration and said second means comprises a comparator for comparing said first means output signal with said second predetermined value representing a predetermined engine vibration magnitude for generating said knocking signal when said first means output signal indicative of engine vibration magnitude exceeds said second predetermined value.

3. A control system as set forth in claim 1 or 2, wherein said fourth means for detecting an unstable engine condition comprises a means for detecting vehicle deceleration.

4. A control system as set forth in claim 1 or 2, wherein said fourth means comprises a means for detecting exhaust gas recirculating condition.

5. A control system as set forth in claim 1 or 2, wherein said fourth means is actuated by an engine starter switch.

6. A control system as set forth in claim 1 or 2, wherein said fourth means comprises a sensor for detecting vehicle deceleration, a sensor for detecting the exhaust gas recirculation condition, an engine temperature sensor and an engine starter switch sensor, said fourth means being operative in response to any of said sensors.

7. A control system as set forth in claim 6, wherein said sensor for detecting the vehicle deceleration is a throttle angle sensor.

8. A control system as set forth in claim 6, wherein said sensor for detecting vehicle deceleration is a vacuum sensor for determining vacuum pressure within the engine intake manifold.

9. A control system as set forth in claim 6, wherein said sensor for detecting vehicle deceleration is a pressure sensor for determining vacuum pressure within the engine intake manifold venturi portion.

10. A control system as set forth in claim 6, wherein said sensor for detecting the vehicle deceleration is a sensor for determining the air flow rate within the engine intake manifold.

11. A spark ignition timing control system for an internal combustion engine, comprising:
knock detector adapted to detect knocking condition of the engine and producing a first signal having a value proportional to the magnitude of engine knocking;
means for comparing said first signal value with a predetermined reference value to detect a magnitude of the engine knocking above a predetermined threshold value, said comparing means producing a second signal when the first signal value is above said reference value;
a spark advance means responsive to said second signal to retard spark advance angle at a given rate, said spark advance means advancing said spark advance angle at a given rate when said second signal is absent; and
means for detecting at least one preselected engine operating condition for which said spark advance angle is not to be retarded, and for disabling the spark advance means to prevent retarding of said spark advance angle when said at least one of specific engine operation condition is detected.

12. A control system as set forth in claim 11, wherein said means for detecting is responsive to turning on of a starter switch.

13. A control system as set forth in claim 11, wherein said means for detecting is adapted to detect engine deceleration.

14. A control system as set forth in claim 13, wherein said means for detecting includes a throttle angle switch for detecting a fully closed position of a throttle valve and wherein said means is responsive to actuation said throttle angle switch to prevent retarding of said spark advance angle.

15. A control system as set forth in claim 11, wherein said means for detecting is adapted to detect operation of exhaust gas recirculation.

16. A control system as set forth in claim 15, wherein said means for detecting includes a pressure sensor adapted for detecting vacuum pressure in an intake manifold and is responsive to increasing intake manifold absolute pressure to prevent retarding of said spark advance angle.

17. A control system as set forth in claim 15, wherein said means for detecting includes an air flow meter for measuring air flow rate in an air induction passage of the engine, said means being responsive to a decreasing air flow rate to prevent retarding of spark said advance angle.

18. A control system as set forth in claim 15, wherein said means for detecting includes a vacuum actuated switch associated with an exhaust gas recirculation control valve, said means being responsive to opening of the exhaust gas recirculation control valve to prevent retarding of said spark advance angle.

* * * * *